3,644,485
2-HYDROXY-4-(2 - HYDROXYETHOXY) BENZO-PHENONE ESTERS AND THEIR USE AS STABILIZERS

Gerald R. Lappin and Wayne V. McConnell, Kingsport, Tenn., assignors to Eastman Kodak Company, Rochester, N.Y.
No Drawing. Filed Apr. 14, 1969, Ser. No. 816,071
Int. Cl. C07c 69/76
U.S. Cl. 260—475 P    1 Claim

ABSTRACT OF THE DISCLOSURE

Compositions of matter of the structure

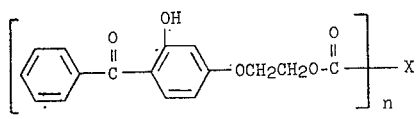

wherein $n = 2, 3,$ or $4$
X=polyvalent organic radical derived from an aliphatic, cycloaliphatic or aromatic polybasic acid and their use as stabilizers for various polymeric materials.

---

This invention relates to compositions containing novel benzophenone compounds and, more particularly, to polymeric compositions containing these benzophenones.

It is known that actinic radiation, particularly in the near ultraviolet region, has a deleterious effect on both the appearance and properties of organic polymers. For example, normally colorless or light-colored polyesters yellow on exposure to sunlight, as do such cellulosics as cellulose acetate. Polystyrene discolors and cracks, with accompanying loss of its desirable physical properties when exposed to actinic light, while vinyl resins, such as vinyl chloride and vinyl acetate, spot and degrade. The rate of air oxidation of polyolefins such as polyethylene and polypropylene is materially accelerated by ultraviolet light.

There are many organic compounds which absorb light rays within the region of from 2500 to about 4000 A. units. Some of these compounds have been used to protect various materials or substrates which are sensitive to these rays by either directly incorporating them into the sensitive substrate or by applying them as a coating to its surface. Another method by which they may be used is to incorporate them into a second substrate, usually a transparent film which then functions as an ultraviolet filter and protects the first substrate. Many of these known photo-stabilizer compounds have not been entirely satisfactory. One of the reasons for this is that they oftentimes absorb weakly in the wavelength region where the harmful ultraviolet rays exist. On the other hand, some of these compounds which have the property of absorbing strongly in the proper wavelength region are usually so insoluble in the substrate that a proper amount of the compound cannot be incorporated therein to obtain the desired degree of protection.

Therefore, it is an object of the present invention to provide novel actinic light-stable plastic compositions. It is another object of the present invention to provide compositions containing novel benzophenone compouds which overcome the above-mentioned difficulties. A further object is to provide polymeric articles containing these benzophenone compounds which articles are photo-stabilized in that they resist the adverse effects of ultraviolet radiation.

Other objects will be apparent from the following description of the invention.

These heretofore listed objects are accomplished by the polymeric composition which comprises an organic polymeric material normally subject to actinic degradation containing a stabilizing amount of at least one benzophenone compound of the following Formula I:

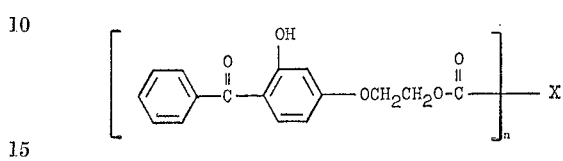

wherein $n = 2, 3,$ or $4$
X=polyvalent organic radical derived from an aliphatic, cycloaliphatic or aromatic polybasic acid.

Representative examples of benzophenone compounds for use in the present invention include:

bis[2-(4-benzoyl-3-hydroxyphenoxy)ethyl]maleate
tris[2-(4-benzoyl-3-hydroxyphenoxy)ethyl]trimellitate
bis[2-(4-benzoyl-3-hyrdroxyphenoxy)ethyl]3,3′-thiodipropionate
bis[2-(4-benzoyl-3-hydroxyphenoxy)ethyl]adipate
bis[2-(4-benzoyl-3-hydroxyphenoxy)ethyl]terephthalate
bis[2-(4-benzoyl-3-hydroxyphenoxy)ethyl]glutarate
bis[2-(4-benzoyl-3-hydroxyphenoxy)ethyl]3,3-dimethylglutarate
bis[2-(4-benzoyl-3-hydroxyphenoxy)ethyl]phthalate
bis[2-(4-benzoyl-3-hydroxyphenoxy)ethyl]hexahydrophthalate
bis[2-(4-benzoyl-3-hydroxyphenoxy)ethyl]isophthalate
bis[2-(4-benzoyl-3-hydroxyphenoxy)ethyl]hexahydroisophthalate
bis[2-(4-benzoyl-3-hydroxyphenoxy)ethyl]hexahydroterephthalate
bis[2-(4-benzoyl-3-hydroxyphenoxy)ethyl]carbonate
bis[2-(4-benzoyl-3-hydroxyphenoxy)ethyl]oxalate
bis[2-(4-benzoyl-3-hydroxyphenoxy)ethyl]pimelate
bis[2-(4-benzoyl-3-hydroxyphenoxy)ethyl]succinate
bis[2-(4-benzoyl-3-hydroxyphenoxy)ethyl]sebacate
bis[2-(4-benzoyl-3-hydroxyphenoxy)ethyl]azelate
bis[2-(4-benzoyl-3-hydroxyphenoxy)ethyl]fumarate
bis[2-(4-benozyl-3-hydroxyphenoxy)ethyl]4,4′-sulfodibenzoate
bis[2-(4-benzoyl-3-hydroxyphenoxy)ethyl]diphenate
tris[2-(4-benzoyl-3-hydroxyphenoxy)ethyl]trimesate
tris[2-(4-benzoyl-3-hydroxyphenoxy)ethyl]hemimellitate
tetrakis[2-(4-benzoyl-3-hydroxyphenoxy)ethyl]butane-1,2,3,4-tetracarboxylate
tetrakis[2-(4-benzoyl-3-hydroxyphenoxy)ethyl]pyromellitate The polymeric compositions of the invention are in general solid macromolecular products which may be transparent, white or light-colored, or colored. They comprise essentially a solid high polymer, preferably having a molecular weight in excess of about 500, which in unstabilized formulations deteriorates upon prolonged exposure to actinic radiation. By actinic radiation is meant light, principally in the near ultraviolet region of about 2500–4000 A., which produces a chemical or physical change in the irradiated target. Because in polymers these changes produce harmful rather than beneficial results, the irradiation tends to shorten the useful life of the polymer.

The benzophenones of this invention which are useful for photo stabilizing the polymeric compositions may be prepared by esterification of a compound of the Formula II:

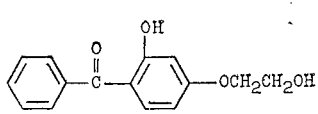

with a polybasic acid or anhydride. Examples of suitable polybasic acids are succinic acid, maleic acid, fumaric acid, glutaric acid, adipic acid, phthalic acid, isophthalic acid, terephthalic acid, mellitic acid, pyromellitic acid, trimellitic acid, diphenic acid, sulfodibenzoic acid, oxydibenzoic acid, thiodipropionic acid, oxydiacetic acid and the like.

The esterification of the benzophenones of Formula II can be carried out by any of several esterification processes that are well known in the art. For example, the acid component, which can be a polybasic acid, the anhydride of a polybasic acid or a molecule containing both anhydride and acid functions (trimellitic anhydride, for example), can be introduced into a well-agitated mixture containing the benzophenone, an acidic catalyst and, if desired, an inert liquid solvent which boils above about 100° C. and forms a water azeotrope. The use of the solvent is not absolutely necessary since esterification of the benzophenones will occur if the reactants are heated in the absence of a solvent. Preferably the esterification reaction is carried out at a temperature between about 100° to about 250° C.

The ratio of the benzophenones of Formula II to the acid or anhydride component of the esterification reaction should be approximately 1 mole of benzophenone per equivalent of carboxylic acid or potential carboxylic acid (i.e. 1 anhydride=2 potential carboxylic acids). As will be appreciated, an excess of acid is not desirable since unesterified acid groups will adversely affect the physical properties of the product and can cause the problem of corrosion of the equipment used to process the polymers containing the benzophenone additives. Therefore, a small excess of the benzophenone (not more than 5 to 10%) may be used to insure complete esterification of the acid.

The acidic catalyst for the esterification of the benzophenone can be any of several well known strong acids such as, for example, benzenesulfonic acid, p-toluene sulfonic acid, sulfoacetic acid, an alkane sulfonic acid, sulfuric acid, or a strongly acidic ion exchange resin. Other known catalysts for esterification such as, for example, zinc chloride, aluminum chloride and titanium tetraalkoxides can be used.

As mentioned briefly hereinabove, the novel benzophenone esters of the present invention are highly useful photostabilizers in that they can be incorporated with a wide variety of substances to absorb ultraviolet radiation. For example, solid organic polymers may be readily stabilized with these benzophenone esters. Typical of such polymers are the vinylic resins, such as the polyvinyl halides, particularly polyvinyl chloride, the polyvinyl esters, such as polyvinyl acetate, and copolymers thereof; the polyvinyl acetals, such as polyvinyl butyral; and the polyvinyl benzenes, such as polymerized styrene, divinyl benzene, vinyl toluene, and their copolymers. Also falling into this general class are the polyacrylates, such polymerized methyl or ethyl acrylate; and the polymerized methacrylates, e.g., methyl methacrylate, ethyl methacrylate; and copolymers of such compounds.

Another class of compounds that can be stabilized by these novel benzophenone esters are solutions or emulsions of polymers useful for forming surface coatings. Examples of these coating compositions, commonly called lacquers, are solutions of cellulose esters such as, for example, cellulose acetate, cellulose butyrate, cellulose nitrate and the like in at least one volatile solvent therefor. Polymers of methyl methacrylate are also very useful in forming coating compositions. The coating compositions may also contain conventional pigments, including metallic particles, and modifiers such as plasticizers, dispersing agents, flow control agents, property modifiers, diluents, and the like.

The polymers of methyl methacrylate useful in these lacquer coating compositions are generally well known and include homopolymers of methyl methacrylate, copolymers of methyl methacrylate and a minor proportion of other copolymerizable materials, or mixtures of the homopolymers and copolymers. Suitable copolymers include copolymers of methyl methacrylate and a minor proportion (e.g. 1%–30%) of a copolymerizable material such as acrylic and methacrylic acids, the $C_1$–$C_4$ alkyl esters of acrylic acid, the $C_2$–$C_4$ alkyl esters of methacrylic acid, vinyl acetate, acrylonitrile, styrene, hydroxyethyl acrylate, or hydroxyethyl methacrylate.

The volatile solvents which may be used are also well known and generally include aliphatic, cycloaliphatic and aromatic hydrocarbons, esters, ethers, ketones and alcohols. Some examples of these are ethyl acetate, $\beta$-ethoxyethyl acetate, methyl ethyl ketone, methyl isobutyl ketone, toluene, xylene, acetone, butyl actate, dimethylacetamide, butyl alcohol, methyl isobutyl carbinol, isopropyl alcohol, amyl alcohol, and the like. The solvents may be used in combination with each other and also as diluents in the coating compositions.

Another class of resinous materials susceptible to ultraviolet degradation are the cellulose plastics, including such esters as cellulose acetate, cellulose propionate, cellulose butyrate, and cellulose acetate butyrate; cellulose nitrate and the like.

Polyesters, particularly those prepared by the reaction of a dihydric alcohol and a dibasic carboxylic acid, are also included in the resin composition of the invention. Exemplary polyesters are those prepared from such glycols as ethylene or propylene glycol and such acids as terephthalic acid, isophthalic acid, or adipic or azelaic acids; maleic or fumaric acid; or phthalic anhydride. These resins tend to yellow severely on exposure to sunlight.

The preferred class of plastics in the compositions of the invention are the polyolefins. The polymers of alpha-olefins stabilized by the compounds of the invention are those normally solid hydrocarbon polymeric materials which are obtained by polymerizing such monoolefins as ethylene, propylene, butene-1; pentene-1; 3-methyl-butene-1; hexene-1; 4-methyl-pentene-1; 4-methyl-hexene-1; 4,4-dimethyl-pentene-1; and the like, as well as their copolymers, e.g., ethylene-propylene copolymers and the like. Polymers of olefins having up to 8 carbon atoms are the preferred species.

Particularly preferred polymers for the compositions of this invention are those normally solid polymers of alpha-olefins having up to three carbon atoms, e.g., ethylene and propylene, and their copolymers.

The stabilized polymeric compositions of the invention are those comprising a major amount of a resin such as those described above in intimate admixture with the benzophenone esters of Formula I. These benzophenone esters can be incorporated into or placed on the polymeric compositions to be stabilized by any of several acceptable methods. For example, when the benzophenone compounds are applied to the various polymeric substrates, they may be used as a solution or a dispersion, or as a liquid in the form of a melt, or as a solid in the form of a powder or dust. The substrate itself may be in solution, a solid or may be a liquid in the form of a melt. In using these benzophenone compounds with the substrates they may be added at any stage during the preparation of the particular substrate provided they do not interfere with the process so as to adversely affect the physical properties of the resulting product and provided they are not transformed during the process of the preparation of the substrate. For example, when it is desired to protect linear high molecular weight polyesters or polyurethanes, it is preferred to introduce the subject compounds after polymer chain extension has been completed.

The amount of the benzophenone compound used should be from 0.10% to 10%, based on the weight of the polymers. The particular amount required to affect the improvements of the present invention will vary depending on the particular benzophenone, the particular polymer and the particular mode of use. Thus, the lower amounts of benzophenone may be used when the compositions are used as coatings. However, when the benzophenone is distributed throughout the thickness of a polymeric film, at least 0.2% is usually necessary to provide any significant improvement.

It will be evident to those skilled in the art that the products prepared from the compositions of the present invention may have incorporated therein, without impairment of their operability, materials of specific functionality. Such materials include dye-stuffs, fillers, pigments, plasticizers, slip agents, anti-static agents, etc. The compositions and the resulting products are considered to be within the scope of this invention.

The following examples will better illustrate the nature of the present invention. Parts are by weight unless otherwise indicated.

EXAMPLE 1

This example describes the preparation of bis[2-(4-benzoyl-3-hydroxyphenoxy)ethyl]maleate using a conventional direct esterification technique. A mixture of 129 grams (g.) [0.50 mole] of 2-hydroxy-4-(2-hydroxyethoxy)benzophenone, 24.5 g. (0.25 mole) of maleic anhydride, 0.5 g. of p-toluenesulfonic acid and 250 milliliters (ml.) of toluene are refluxed under atmospheric pressure in a 100 ml. flask connected to a water separator for 6.5 hours. After this refluxing the hot solution is filtered. The solution is then diluted with 75 ml. of hexane and gradually cooled to 5° C. where it is held for 2 hours. The solid crystalline particles which precipitates out of the solution are collected by filtration and air dried. Approximately 128 g. of pale yellow crystals having a melting point (M.P.) of 112–114° C. is produced. The structure of the crystalline product is confirmed by its infrared (IR) and nuclear magnetic resonance (NMR) spectra.

EXAMPLE 2

Using similar procedures as described in Example 1 but substituting 32 g. (0.17 mole) of trimellitic anhydride for the maleic anhydride, there is obtained tris[2-(4-benzoyl-3-hydroxyphenoxy)ethyl]trimellitate. After completion of the reaction the hot solution is filtered, cooled and washed with aqueous sodium bicarbonate. The solvent is removed from the non-crystalline glass-like benzophenone product in a rotary evaporator under approximately 0.5 atmosphere of pressure to yield 150 grams of the product obtained as a non-crystalline pale amber glass. The structure of the product is confirmed by IR and NMR spectra.

EXAMPLE 3

The procedure of Example 1 is followed except that 65 g. (0.25 mole) of 2-hydroxy-4-(2-hydroxyethoxy)benzophenone is used and 22 g. (0.13 mole) of 3,3'-thiodipropionic acid is substituted for the maleic anhydride to produce 76 g. of bis[2-(4-benzoyl-3-hydroxyphenoxy)ethyl]-3,3'-thiodipropionate, which is crystalline in form and has a M.P. of 85–86° C. The structure of the product is confirmed by IR and NMR spectra.

EXAMPLE 4

Bis[2-(4-benzoyl - 3 - hydroxyphenoxy)ethyl]adipate, which is a pale yellow colored crystalline material having a M.P. of 100–104° C., is prepared using the procedure of Example 1 except that adipic acid is substituted for the maleic anhydride. The structure of the product is confirmed by IR and NMR spectra.

EXAMPLE 5

This example describes the preparation of bis[2-(4-benzoyl - 3 - hydroxyphenoxy)ethyl]terephthalate. A mixture of 18 g. (0.07 mole) of 2-hydroxy-4-(2-hydroxyethoxy)benzophenone, 5.8 g. (0.03 mole) of dimethyl terephthalate, 300 ml. of toluene and 1 g. of p-toluenesulfonic acid are refluxed in a 100 ml. flask at approximately 115° C. under atmospheric pressure for 20 hours. The 100 ml. flask is equipped with a distillation column to remove the methanol produced during this reflux period. The reaction mixture is then allowed to cool to room temperature effecting the precipitation of pale yellow colored crystals. This solid product is washed with 100 ml. of boiling ethanol and recrystallized from dimethylacetamide to give 15 g. of yellow crystals having a M.P. 193–194° C. The structure of the product is confirmed by saponification equivalent.

EXAMPLE 6

Bis[2-(4 - benzoyl-3-hydroxyphenoxy)ethyl]isophthalate, which is a pale amber glassy solid, is prepared using the procedure of Example 1 except that 108 g. (0.42 mole) of 2-hydroxy-4-(2-hydroxyethoxy)benzophenone is esterified with 32.2 g. (0.2 mole) of isophthalic acid. The yield is 130 g. and the structure is confirmed by IR and NMR spectra.

EXAMPLE 7

Bis[2 - (4 - benzoyl-3-hydroxyphenoxy)ethyl]phthalate, which is a pale yellow crystal having a M.P. of 68–70° C., is prepared using the procedure of Example 1 except that 108 g. (0.42 mole) of 2-hydroxy-4-(2-hydroxyethoxy)benzophenone is esterified with 29.6 g. (0.2 mole) of phthalic anhydride. The yield is 106 g. and the structure is confirmed by IR and NMR spectra.

EXAMPLE 8

Bis[2 - (4-benzoyl - 3 - hydroxyphenoxy)ethyl]hexahydrophthalate, which is a viscous pale yellow oil, is prepared using the procedure of Example 1 except that 108 g. (0.42 mole) of 2-hydroxy-4-(2-hydroxyethoxy)benzophenone is esterified with 30.8 g. (0.02 mole) of hexahydrophthalic anhydride. The yield is 102 g. and the structure is confirmed by IR and NMR spectra.

EXAMPLE 9

Bis[2-(4-benzoyl - 3 - hydroxyphenoxy)ethyl]hexahydroterephthalate is prepared using the procedure of Example 1 except that 108 g. (0.42 mole) of 2-hydroxy-4-(2-hydroxyethoxy)benzophenone is esterified with 34.4 g. (0.2 mole) of hexahydroterephthalic acid. The yield is 81 g. of pale yellow crystals, M.P. 124–126° C., after recrystallization from benzene. The structure of the crystals is confirmed by IR and NMR spectra.

EXAMPLE 10

Tris[2 - (4-benzoyl-3-hydroxyphenoxy)ethyl]trimesate is prepared using the procedure of Example 1 except that 75 g. (0.3 mole) of 2-hydroxy-4-(2-hydroxyethoxy)benzophenone is esterified with 21 g. (0.1 mole) of trimesic acid. The yield is 58 g. of pale yellow crystals, M.P. 205–207° C., after recrystallization from dimethyl formamide. The structure is confirmed by IR and NMR spectra.

EXAMPLE 11

Bis[2 - (4-benzoyl-3-hydroxyphenoxy)ethyl]succinate is prepared using the procedure of Example 1 except that 108 g. (0.42 mole) of 2-hydroxy-4-(2-hydroxyethoxy)benzophenone is esterified with 20 g. (0.2 mole) of succinic acid. The yield is 86 g. of almost white crystals, M.P. 112–114° C., after recrystallization from benzene. The structure is confirmed by IR and NMR spectra.

EXAMPLE 12

Tetrabis[2-(4-benzoyl - 3 - hydroxyphenoxy)ethyl]butane-1,2,3,4-tetracarboxylate is prepared using the procedure of Example 1 except that 108 g. (0.42 mole) of 2-hydroxy-4-(2 - hydroxyethoxy)benzophenone is esterified with 23.4 g. (0.1 mole) of butane-1,2,3,4-tetracarboxylic acid. The yield is 102 g. of pale amber glass.

EXAMPLES 13–25

Two percent (2%) by weight of each of the stabilizers listed in Table I is incorporated in a lacquer having the following formulation:

| Component: | Percent by weight |
|---|---|
| Copolymer— Methyl methacrylate, and butyl methacrylate | 35 |
| Cellulose acetate/butyrate | 7.5 |
| Butyl benzyl phthalate | 10 |
| Toluene | 10 |
| Methyl ethyl ketone | 15 |
| Ethyl acetate | 21 |
| Aluminum flake | 1.5 |

Steel panels are sprayed with these stabilized lacquers, the coatings are cured and the panels are then exposed in an Atlas XWR Weather-O-meter (WO) for 500 hrs. (Anal. Chem. 25, 460, 1953). The gloss retention is then measured using a Gardner gloss meter. Similar panels sprayed with the unstabilized lacquer and with the lacquer stabilized with 4-dodecyloxy-2-hydroxylbenzophenone (DOBP), which is currently used in commercial lacquers of this type, is also exposed to the WO for 500 hours under identical conditions and measured for comparison purposes.

TABLE I

| Example | Stabilizer | Percent gloss retention [1] |
|---|---|---|
| 13 | None | 6 |
| 14 | 2-hydroxy-4-dodecyloxybenzophenone | 9 |
| 15 | Bis[2-(4-benzoyl-3-hydroxyphenoxy) ethyl] maleate. | 44 |
| 16 | Tris[2-(4-benzoyl-3-hydroxyphenoxy) ethyl] trimellitate. | 24 |
| 17 | Bis[2-(4-benzoyl-3-hydroxyphenoxy) ethyl] adipate. | 39 |
| 18 | Bis[2-(4-benzoyl-3-hydroxyphenoxy) ethyl] succinate. | 34 |
| 19 | Bis[2-(4-benzoyl-3-hydroxyphenoxy) ethyl] glutarate. | 28 |
| 20 | Bis[2-(4-benzoyl-3-hydroxyphenoxy)-ethyl] trimesate. | 27 |
| 21 | Bis[2-(4-benzoyl-3-hydroxyphenoxy)-ethyl] phthalate. | 36 |
| 22 | Bis[2-(4-benzoyl-3-hydroxyphenoxy)-ethyl] isophthalate. | 40 |
| 23 | Bis[2-(4-benzoyl-3-hydroxyphenoxy)-ethyl] hexahydroisophthalate. | 42 |
| 24 | Bis[2-(4-benzoyl-3-hydroxyphenoxy)-ethyl] hexahydroterephthalate. | 37 |
| 25 | Bis[2-(4-benzoyl-3-hydroxyphenoxy)-ethyl] 3,3'-thiodipropionate. | 32 |

[1] After 500 hours WO exposure.

EXAMPLES 26–36

Five percent (5%) by weight of each of the stabilizers listed in Table II is incorporated into a highly crystalline plastic grade (density 0.915) polypropylene, which has an average molecular weight greater than 15,000 and an inherent viscosity in Tetralin at 145° C. of 1.5 or greater, by dissolving both the stabilizer and polypropylene in hot Tetralin. The stabilizer-polypropylene dope is cast into a film having a thickness of approximately 3 mils. The film is then exposed in a modified Atlas Weather-O-meter (Anal. Chem. 25, 460, 1953) until they become brittle (i.e. break on creasing).

TABLE II

| Example | Stabilizer | Time in hours to brittleness |
|---|---|---|
| 26 | None | 123 |
| 27 | Bis[2-(4-benzoyl-3-hydroxyphenoxy)-ethyl] maleate. | 356 |
| 28 | Tris[2-(4-benzoyl-3-hydroxyphenoxy)-ethyl] trimellitate. | 311 |
| 29 | Bis[2-(4-benzoyl-3-hydroxyphenoxy)-ethyl]-3,3'-thiodipropionate. | 550 |
| 30 | Bis[2-(4-benzoyl-3-hydroxyphenoxy)-ethyl] adipate. | 458 |
| 31 | Bis[2-(4-benzoyl-3-hydroxyphenoxy)-ethyl] terephthalate. | 185 |
| 32 | Bis[2-(4-benzoyl-3-hydroxyphenoxy)-ethyl] fumarate. | 340 |
| 33 | Bis[2-(4-benzoyl-3-hydroxyphenoxy)-ethyl] succinate. | 410 |
| 34 | Bis[2-(4-benzoyl-3-hydroxyphenoxy)-ethyl] phthalate. | 475 |
| 35 | Bis[2-(4-benzoyl-3-hydroxyphenoxy)-ethyl] hexahydroisophthalate. | 346 |
| 36 | Bis[2-(4-benzoyl-3-hydroxyphenoxy)-ethyl] isophthalate. | 492 |

EXAMPLES 37–47

One percent (1%) by weight of each of the stabilizers listed in Table III is incorporated into normally solid polyethylene by hot roll compounding the compounds for 4 minutes, the temperature of the front roll being held at 270° F. and the temperature of the rear roll being at 220° F. The resulting roll mix is then compression molded into flat plate-like samples. A specimen of each sample is analyzed by infrared to determine the concentration of carbonyl groups. Each sample is then placed outdoors at Kingsport, Tenn., on a rack adapted to position the specimen at an angle of 36.5° to the horizontal. At the end of 10 weeks exposure, the sample is removed and again analyzed by infrared to determine the concentration of carbonyl groups. The results of the test is given in the following Table III.

TABLE III

| Example | Stabilizer | Increase in carbonyl concentration [1] |
|---|---|---|
| 37 | None | 19.5 |
| 38 | Bis[2-(4-benzoyl-3-hydroxyphenoxy)-ethyl] maleate. | 0.0 |
| 39 | Bis[2-(4-benzoyl-3-hydroxyphenoxy)-ethyl] succinate. | 0.0 |
| 40 | Bis[2-(4-benzoyl-3-hydroxyphenoxy)-ethyl] phthalate. | 0.0 |
| 41 | Bis[2-(4-benzoyl-3-hydroxyphenoxy)-ethyl] hexahydroisophthalate. | 0.0 |
| 42 | Bis[2-(4-benzoyl-3-hydroxyphenoxy)-ethyl] fumarate. | 0.0 |
| 43 | Bis[2-(4-benzoyl-3-hydroxyphenoxy)-ethyl] adipate. | 0.0 |
| 44 | Bis[2-(4-benzoyl-3-hydroxyphenoxy)-ethyl] glutarate. | 0.0 |
| 45 | Bis[2-(4-benzoyl-3-hydroxyphenoxy)-ethyl] trimesate. | 0.0 |
| 46 | Bis[2-(4-benzoyl-3-hydroxyphenoxy)-ethyl] butanetetracarboxylate. | 0.0 |
| 47 | Bis[2-(4-benzoyl-3-hydroxyphenoxy)-ethyl] isophthalate. | 0.0 |

[1] After ten weeks of exposure.

Thus, having described the invention in detail, it will be understood by those skilled in the art that certain variations and modifications may be made without departing from the spirit and scope of the invention as described herein.

We claim:
1. The compound tris-[2-(4-benzoyl-3-hydroxyphenoxy) ethyl]trimellitate.

References Cited

UNITED STATES PATENTS 3,322,817  5/1967  Goldberg et al. _____ 260—475

LORRAINE A. WEINBERGER, Primary Examiner

R. GRESTL, Assistant Examiner

U.S. Cl. X.R.

117—132 R; 260—17 A, 41 B, 45.85, 227, 463, 468 R, 470, 481 R, 485 G